United States Patent [19]

Alexander

[11] Patent Number: 4,597,614
[45] Date of Patent: Jul. 1, 1986

[54] STORAGE/DISPENSER RACK FOR RECTANGULAR ARTICLES

[76] Inventor: Steven G. Alexander, 27850 Dartmouth, Madison Heights, Mich. 48071

[21] Appl. No.: 707,158

[22] Filed: Mar. 1, 1985

[51] Int. Cl.⁴ .......................... A47F 3/02; B65G 59/00; B65D 25/54
[52] U.S. Cl. ...................................... 312/42; 312/121; 221/281; 220/82 R
[58] Field of Search .................. 312/42, 121, 50, 45, 312/60, 61, 71; 221/281; 220/82 R; 206/44.11, 45.34

[56] References Cited
U.S. PATENT DOCUMENTS

| | | | |
|---|---|---|---|
| 849,590 | 4/1907 | Bailey | 312/42 |
| 1,725,372 | 4/1929 | Richman | 312/42 |
| 3,352,614 | 11/1967 | Andersen | 312/42 |
| 4,132,329 | 1/1979 | Harrison | 312/60 |

FOREIGN PATENT DOCUMENTS 1374859  8/1964  France ..................... 312/42

*Primary Examiner*—William E. Lyddane
*Assistant Examiner*—Gerald Anderson
*Attorney, Agent, or Firm*—Barnes, Kisselle, Raisch, Choate, Whittemore & Hulbert

[57] ABSTRACT

A storage/dispenser rack for rectangular articles of predetermined dimension comprising a rectangular box having five opaque walls and a sixth front wall of transparent construction. A plurality of openings are formed in the transparent front wall at spacings corresponding to integral multiples of the thickness dimension of stored articles so that when articles are stacked within the enclosure, one such article will be presented at each opening. Each front wall opening registers with semi-circular recesses in the adjacent enclosure sidewalls to permit manual grasping of the articles and extraction thereof from the enclosure through the front wall openings.

7 Claims, 4 Drawing Figures

STORAGE/DISPENSER RACK FOR RECTANGULAR ARTICLES

The present invention is directed to dispensing apparatus, and more particularly to a storage/dispenser rack for rectangular articles of predetermined substantially identical dimension.

It is a general object of the present invention to provide apparatus for storing rectangular articles of predetermined substantial identical dimension, such as audio cassettes, video cassettes or video game cartridges, which is economical to manufacture, which is easy to install and use, and from which articles may be selectively withdrawn without requiring removal of remaining articles. A more particular object of the invention is to provide a storage/dispenser rack of the described character which includes facility for vertical mounting on a wall or the like, facility for viewing the titles of articles stored therein, and facility for removal of the desired article without removing the rack from the wall and without removing a substantial number of undesired articles from the rack.

The invention, together with additional objects, features and advantages thereof, will be best understood from the following description, the appended claims and the accompanying drawing in which:

Figure 1:
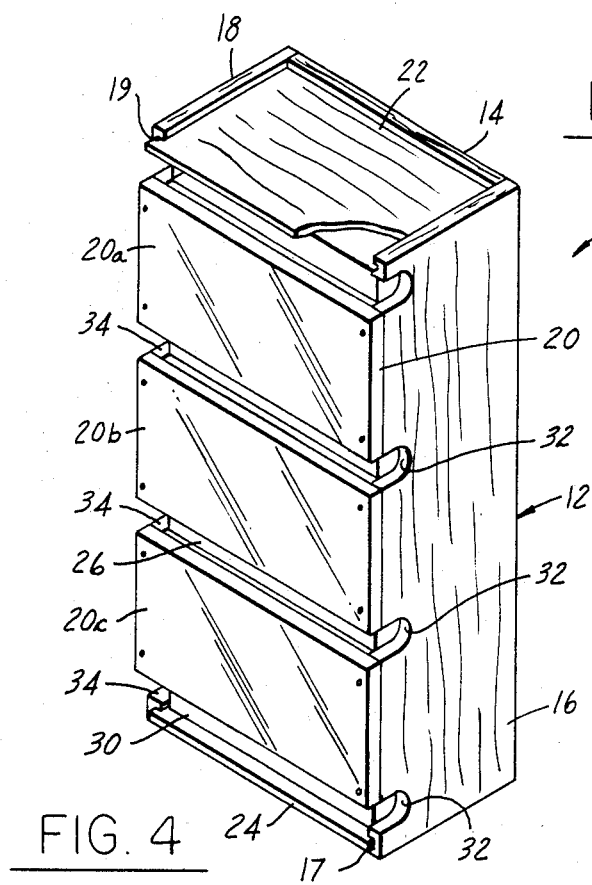
FIG. 1 is a front perspective view of an article storage and dispenser rack in accordance with a presently preferred embodiment of the invention and having a number of articles stored therein.
Figure 2:
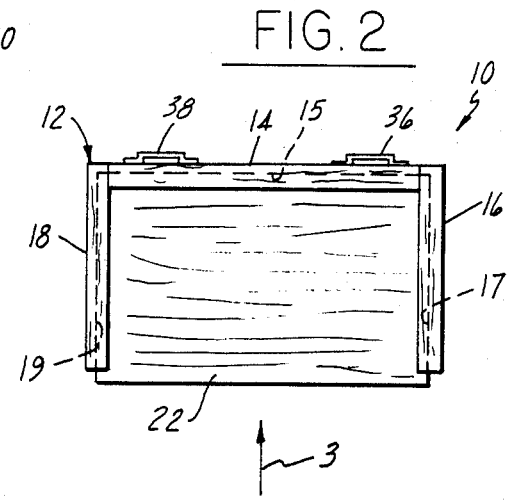
FIG. 2 is a top plan view of the storage/dispenser rack of FIG. 1.
Figure 4:
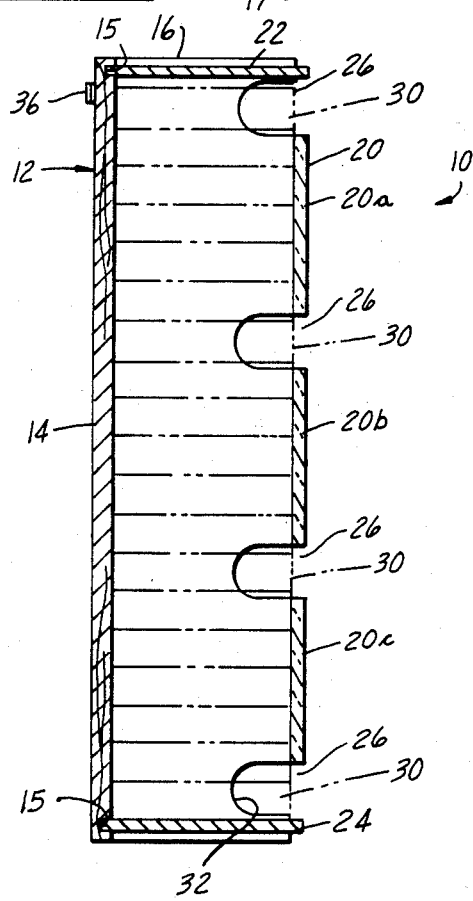
Figure 3:
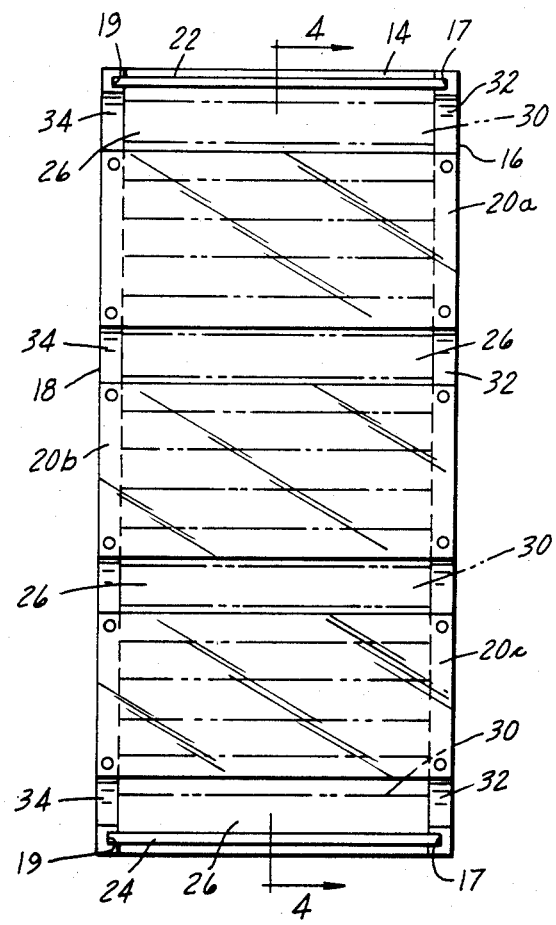

FIG. 3 is a front elevational view of the rack of FIGS. 1 and 2 viewed from the direction 3 in FIG. 2; and FIG. 4 is a sectional view taken substantially along the line 4—4 of FIG. 3.

In the following description and claims, reference is made to storage and dispensation of articles having predetermined substantially identical rectangular dimensions. Audio tape cassettes in individual storage containers are an example of such articles, and the invention is illustrated in the drawing in connection therewith. However, it will be appreciated that the invention has equal utility in connection with other articles wherein industry standards or conventions are such that the articles have substantially identical rectangular dimensions. Video tape cassettes in VHS or Beta format are two examples of articles wherein industry standards establish article dimensions (within manufacturing tolerances). Game cartridges for electronic video games are an example of articles which do not have uniform dimensions by industry standards, but which do possess uniform dimensions for each manufacturer's game system.

An embodiment of the invention is specifically adapted for use in conjunction with a particular type or class of article—e.g., audio tape cassettes—having predetermined rectangular dimensions. That is, all prerecorded audio cassettes, and a substantial number of blank cassettes, are marketed in individual containers having substantially identical width, depth and thickness dimensions. The thickness dimension is substantially less than the width and depth dimensions, so that the cassettes may be arranged or stacked "flatwise"—i.e. with width and depth dimensions in parallel planes and with thickness dimensions aligned. Music title is labelled along one long edge. This discussion also applied to video cassettes, game cassettes, game cartridges, etc., although actual dimensions differ. Thus, one embodiment of the invention would be provided for audio cassettes, another for VHS video cassettes, another for Beta video cassettes, etc.

In general, the present invention contemplates a rectangular enclosure dimensioned so that articles of the described character may be stacked flatwise therewithin. The front wall of the enclosure is transparent so that article titles may be viewed from externally of the container. A plurality of slots or openings are formed in the enclosure front wall, with the slots being spaced from each other lengthwise of the enclosure by integral multiples of the predetermined article thickness dimension. One such slot is positioned adjacent to the enclosure bottom wall, another slot adjacent to the top wall, and the remaining uniformly spaced therebetween in the preferred embodiment of the invention. In this way, an article—e.g. an audio cassette—is presented at each slot.

Semicircular recesses are formed in the enclosure side walls on opposite sides of and laterally aligned with the slots or openings in the enclosure front wall. These recesses permit manual grasping of an article and withdrawal of an article through the slot. Thus, an article in the center of the enclosure, for example, may be withdrawn through one of the intermediate slots without requiring removal of all of the articles beneath it. If the article is not already aligned with a removal slot, a few articles may be removed from the next-lower slot and re-inserted in the top slot until the desired article is aligned with a slot.

More specifically, the drawing illustrates a storage/dispenser rack 10 in accordance with a presently preferred embodiment of the invention as comprising a rectangular enclosure 12 having a flat back wall 14, spaced parallel sidewalls 16,18 projecting from back wall 14, and a front wall 20 spanning sidewalls 16,18 in spaced parallel relation to back wall 14. Back wall 14, sidewalls 16,18 and front wall 20 are parallel with the central axis or longitudinal dimension of enclosure 12. Slots 17, 19 and 15 are formed in sidewalls 16,18 and back wall 14 respectively adjacent to each longitudinal end of enclosure 12 and are aligned or coplanar in assembly. A pair of end wall panels 22,24 are removably slidably received from forwardly of enclosure 12 into such slots at each end of enclosure 12 perpendicularly of the central enclosure axis. The enclosure walls thus form an open rectangular cavity. The side, back and front walls are spaced from each other in assembly so as to correspond with the width and depth dimension of a particular article for which the enclosure is designed, so that the articles may be removably slidably stacked "flatwise" therein in the direction of the enclosure longitudinal dimension. The end walls are spaced from each other so as to permit enclosure of a plurality of such articles stacked one upon another, with the thickness dimension of each article extending in the direction of the enclosure axis.

In accordance with the distinguishing features of the present invention, a plurality of slots or openings 26 extend laterally across front wall 20 between sidewalls 16,18 and are spaced from each other in the direction of the enclosure axis. In the specific embodiment of the drawing, front wall 20 comprises three spaced front wall segments 20a, 20b, 20c individually fastened to the forward edges of sidewalls 16,18, with an opening 26 being formed between opposed parallel edges of successive segment pairs 20a, 20b and 20b, 20c, and between end segments 20a, 20c and adjacent end panels 22,24. Slots 26 are spaced from each other by integral multiples of the thickness dimension of the articles to be contained therein, and have a dimension parallel to the enclosure axis greater than such thickness dimension but less than twice such thickness dimension. Most preferably, openings 26 are uniformly spaced from each other in the direction of the enclosure axis, with one opening 26 being positioned adjacent to end panel 24 and another opening being positioned adjacent to end panel 22. In the embodiment of the drawing, slots 26 are spaced from each other by six thickness dimensions of audio cassettes 30.

A plurality of longitudinally spaced forwardly opening semicircular recesses 32 are formed in the edge of sidewall 16 remote from back wall 14, with one recess 32 opening into and being aligned with each front wall slot or opening 26. An opposing plurality of identical recesses 34 are formed in sidewall 18 in registry with openings 26. Thus, the outside forward edges of cassettes 30 may be manually grasped through recesses 32,34 and withdrawn through slots 26. A pair of hangers 36,38 are affixed to back wall 14 of enclosure 12 adjacent to the end thereof for suspending the enclosure from a wall or the like, such that the enclosure axis is oriented vertically and end walls 22,24 form top and bottom enclosure walls respectively. Front wall segments 20a, 20b, 20c are preferably of transparent plastic construction. The remainder of enclosure 12 may be of opaque or transparent wood, metal or plastic as desired. Opaque wood walls are illustrated in the drawing.

With enclosure 12 vertically suspended, audio cassettes 30 may be loaded therein by inserting the same one at a time through openings 26 or by removing top wall panel 22. Cassettes 30 are thus stored in vertically stacked configuration, and have music titles or other suitable identifying indicia facing outwardly through transparent front wall 20 so that a desired cassette can be seen and identified. To extract a desired cassette, if the cassette is aligned with an opening 26, the cassette is manually grasped through sidewall recesses 32,34 and extracted. The dimensions of slot 26 are such that only one cassette can be so extracted at a time, the remaining cassettes in the rack falling downwardly by gravity when the cassette is removed. If the desired cassette is not initially in registry with an opening 26, cassettes are removed from the next-lower opening until the desired cassette registers therewith. All cassettes extracted from the enclosure may be returned thereto by insertion through the top opening 26.

Thus, in accordance with the distinguishing feature of the invention, a desired cassette may be removed from the enclosure without having to withdraw a multiplicity of cassettes therefrom. Although it is presently preferred to suspend enclosure 12 from a wall or the like as described, the enclosure may also be used for cassette storage on the shelf, for example, and oriented by hand in a vertical direction when it is desired to extract a cassette therefrom.

The invention claimed is:

1. A storage/dispenser rack for rectangular articles having predetermined substantially identical width, depth and thickness dimensions, with the thickness dimension being less than the width and depth dimensions, said rack comprising a rectangular enclosure having a back wall, spaced sidewalls projecting from said back wall, a front wall bridging said sidewalls and spaced from said back wall, and opposed end walls, said enclosure having an open internal volume bounded by said walls and an axis parallel to said front, back and side walls, spacing between said front, back and side walls corresponding to the width and depth dimensions of an article and spacing between said end walls being sufficient to permit stacking of a plurality of said articles within said enclosure with thickness dimensions parallel to said axis, a plurality of at least three rectangular openings extending laterally of said axis across said front wall between said sidewalls, each said opening having a width parallel to said axis greater than said predetermined article thickness but less than twice said thickness, said openings being spaced from each other between said end walls by integral multiples of said predetermined thickness, one said opening being positioned adjacent to each said end wall and a third said opening being spaced from said end walls between said end-wall-adjacent openings, and a plurality of recesses in each said sidewall disposed in opposed pairs aligned with said openings and being dimensioned to permit grasping and withdrawal of an article through said openings.

2. The storage/dispenser rack set forth in claim 1 wherein said front wall is of transparent construction.

3. The storage/dispenser rack set forth in claim 2 wherein said recesses are of semicircular construction, said recesses having a dimension in the direction of said axis equal to the dimension of said openings parallel to said axis.

4. The storage/dispenser rack set forth in claim 3 wherein said openings are uniformly spaced from each other in the direction of said axis.

5. The storage/dispenser rack set forth in claim 4 further comprising means for suspending said enclosure such that said axis is oriented vertically, with one said end wall forming a bottom wall of said enclosure.

6. The storage/dispenser rack set forth in claim 5 wherein said sidewalls have laterally opposed slots adjacent to one end thereof, and wherein one said end wall comprises a panel removably slidably received in said slots.

7. The storage/dispenser rack set forth in claim 1 wherein said sidewalls have opposed slots at opposed ends of said enclosure, and wherein said end walls comprise a pair of panels removably slidably received in said slots.

* * * * *